United States Patent [19]
Estrada

[11] 3,953,831
[45] Apr. 27, 1976

[54] ALARM SYSTEM FOR USE WITH CIGARETTE LIGHTER RECEPTACLE OF VEHICLE

[76] Inventor: Richard J. Estrada, 758 Arkansa, San Francisco, Calif. 94197

[22] Filed: July 9, 1973

[21] Appl. No.: 377,365

[52] U.S. Cl.................................. 340/53; 180/99; 340/279
[51] Int. Cl.² ..................... B60Q 1/52; B60K 28/00
[58] Field of Search.................. 340/52 R, 53, 279; 180/96, 99; 339/10; 307/10 R

[56] References Cited
UNITED STATES PATENTS

| | | | |
|---|---|---|---|
| 3,011,040 | 11/1961 | DeRemer et al...................... | 340/279 |
| 3,049,188 | 8/1962 | Giannetti.............................. | 180/99 |
| 3,208,062 | 9/1965 | Gregory............................... | 340/279 |
| 3,338,240 | 8/1967 | Raupp................................. | 340/279 |
| 3,514,623 | 5/1970 | Ballard............................... | 307/10 R |
| 3,559,206 | 1/1971 | Beecham ........................... | 340/279 |

Primary Examiner—John W. Caldwell
Assistant Examiner—Joseph E. Nowicki
Attorney, Agent, or Firm—Townsend and Townsend

[57] ABSTRACT

A system for actuating an alarm and for stopping the engine of a vehicle when the vehicle driver starts to doze or fall asleep. The system includes a mercury switch attachable to the head of the driver, such as on a pair of eyeglasses, and the switch is coupled to a cable having a plug for insertion into the conventional cigarette lighter receptacle on the dashboard of the vehicle. A light flasher, a relay coil, and a buzzer are electrically coupled to the receptacle and energized simultaneously when the mercury switch closes upon movement of the head. The flasher and buzzer provide visual and audible alarms while the relay coil operates a normally closed switch for opening the ignition circuit of the vehicle to stop the engine.

3 Claims, 2 Drawing Figures

U.S. Patent   April 27, 1976   3,953,831
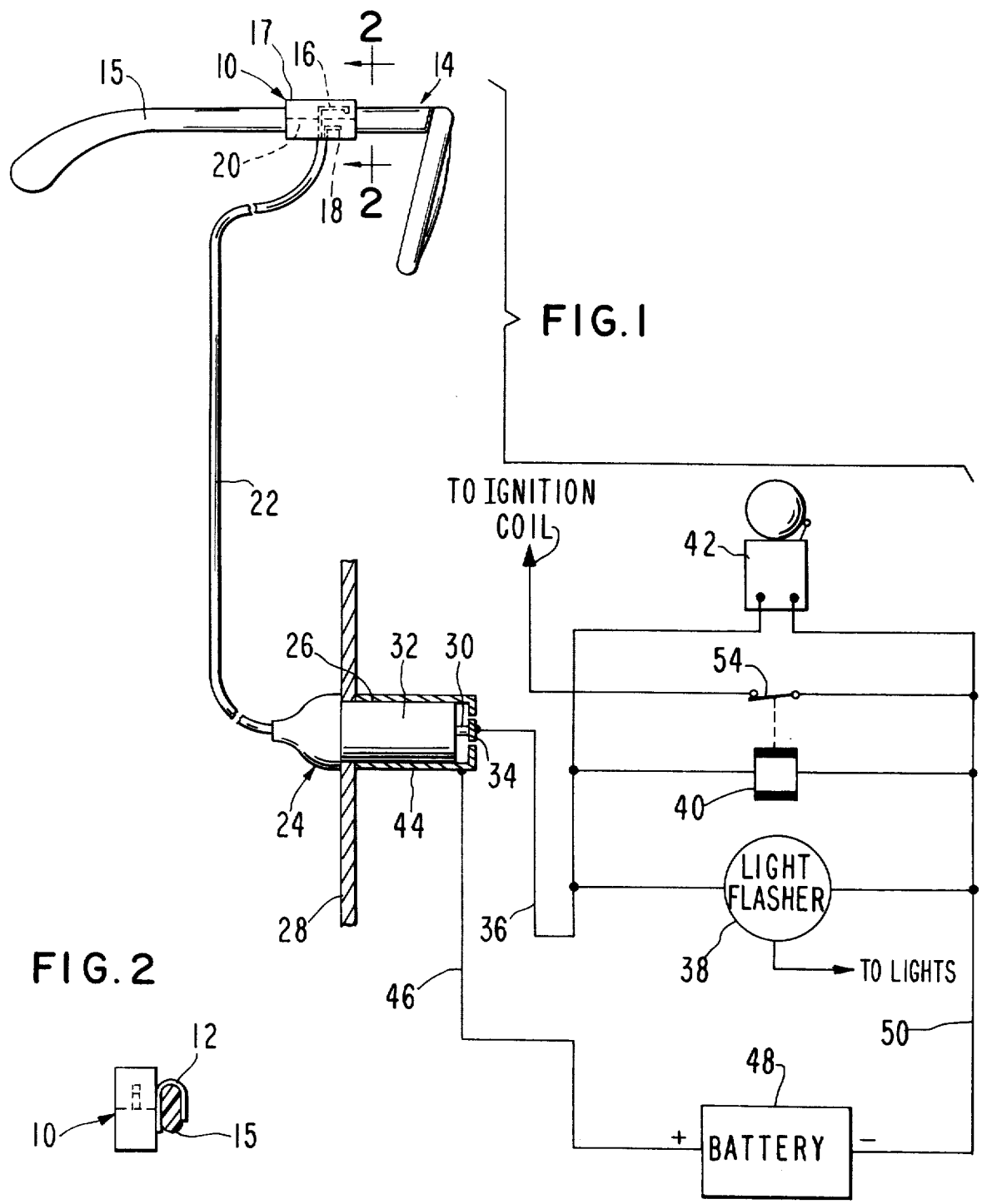

ALARM SYSTEM FOR USE WITH CIGARETTE LIGHTER RECEPTACLE OF VEHICLE

This invention relates to improvements in vehicle alarm systems and, more particularly, to a system which warns a vehicle driver that he is dozing or falling asleep when the vehicle engine is operating.

A number of attempts have been made to provide alarm systems for vehicle drivers to warn them when they start to doze or fall asleep. In some cases, such systems have been responsive to the head movements of the driver, such as occur during dozing. For the most part, these devices have been constructed so that they are self-contained units, i.e., carried completely on the person. Typical of these systems are the types disclosed in U.S. Pat. Nos. 2,054,484, 3,045,255 and 3,524,030. Because these systems are self-contained, they have their own power sources and, as a result, are not only bulky but heavy as well. This is an inconvenience for the driver as it affects his comfort while driving.

The present invention is directed to a vehicle warning system which is simpler and more permanent than those mentioned above. Moreover, it is less bulky and considerably more light-weight in construction than conventional systems because it is not a self-contained unit. Instead, it utilizes the battery of the vehicle as well as the conventional cigarette lighter receptacle commonly found on many automobiles and trucks. The system merely requires a switch mounted on the head of the vehicle driver, such as on the side of a pair of eyeglasses worn by the driver, so that the forward tilt of the head will close the switch and will actuate one or more alarms. A mercury switch is preferred, since it is simple in construction and operation and can be readily attached to the side of a pair of eyeglasses. It can be coupled by a suitable plug and cable to the cigarette lighter receptacle. Coupled to the receptacle are a light flasher, a buzzer and a relay coil; the relay coil being provided with a normally closed switch which opens when the relay coil is energized. Such a switch can be placed in series relationship with the ignition circuit of the vehicle so as to open such circuit and cause the engine of the vehicle to stop in the event that the mercury switch is closed. The flasher and buzzer provide the visual and audible alarms, the flasher activating the head and taillights to warn other motorists, and the buzzer mounted in some suitable location near the driver of the subject vehicle.

The invention provides a simple means of placing the mercury switch in operation to energize the various alarm devices without having to carry the devices on the person. It is only necessary for the driver to place the switch on the eyeglasses and then to insert the connecting plug into the cigarette lighter receptacle, whereupon the system is ready for use and can remain in operation until the plug is removed. The flasher, the buzzer and the relay coil are permanently attached to the receptacle and to the battery of the vehicle, thus making it a simple matter to remove the plug from the receptacle to deactuate the system. The invention also allows the vehicle to be operated without the plug in place inasmuch as the switch of the relay coil will be normally closed so that, when the plug is out of the cigarette lighter receptacle, the ignition circuit is sure to be closed when the conventional ignition switch is closed.

The primary objection of this invention is to provide an improved vehicle alarm system of the type which senses head movements of the vehicle driver wherein the system can be quickly placed in operation by coupling a switch to the conventional cigarette lighter receptacle on the vehicle dashboard to couple the switch with one or more alarm devices permanently connected to the receptacle to thereby eliminate self-contained units conventionally used for this purpose.

Another object of this invention is to provide a system of the type described which includes a mercury switch which can be quickly placed on a pair of eyeglasses and coupled to the cigarette lighter receptacle to place the system in operation, yet the vehicle can continue to operate in the normal fashion if the system is not to be used.

Other objects of this invention will become apparent as the following specification progresses, reference being had to the accompanying drawing for an illustration of the invention.

In the drawings:

FIG. 1 is a view, partly schematic, of the system of the present invention; and

FIG. 2 is a cross-sectional view taken along line 2—2 of FIG. 1.

The vehicle warning system of this invention is shown in FIG. 1 and includes a mercury switch 10 having a pair of spaced hooks 12 (FIG. 2) for removably mounting the switch on the side of a pair of glasses 14, such as on the temple 15, in the manner shown in FIG. 2. The switch has a closed housing 17 in which a pair of terminals 16 and 18 and a pool 20 of mercury are disposed, the mercury pool being below electrode 16 but covering electrode 18 when the temple 15 is generally horizontal, such as when the wearer's head is upright and in a position to view the scene forwardly of the eyeglasses. In this case, the switch is open. However, if the wearer nods or dozes and the head falls forwardly, the mercury pool fills the front end of the switch housing, thereby shorting terminals 16 and 18 and closing the switch.

The mercury switch is coupled by a cable 22 to a plug 24 which is adapted to be received within the conventional cigarette lighter receptacle 26 on the dashboard 28 of a vehicle. Plug 24 has a central terminal 30 electrically coupled to terminal 16 and an outer, cylindrical terminal 32 electrically coupled to terminal 18. Terminal 30 is adapted to engage a fixed terminal 34 which is electrically coupled by a lead 36 to one side of each of a light flasher 38, a relay coil 40, and the coil of a buzzer 42. Terminal 32 of plug 24 is adapted to electrically engage the inner surface of a metal casing 44 defining receptacle 26, and the casing is coupled by a lead 46 to one side of the battery 48 of the vehicle. The opposite side of the battery is coupled by a lead 50 to the opposite sides of light flasher 38, relay coil 40 and the coil of buzzer 42.

Relay 40 is provided with a normally closed switch 54 which is coupled to the ignition circuit of the vehicle to deenergize the same in the event that mercury switch 20 is closed. For instance, switch 54 can be connected in series relationship with the ignition switch of the vehicle, in which case, when relay coil 40 is energized, switch 54 is opened, thereby breaking the circuit to the ignition coil and stopping the vehicle engine.

In use, mercury switch 20 is placed on temple 15 and the glasses are worn by the driver of the vehicle. Plug 24 is inserted into receptacle 26 and, so long as temple 15 is substantially horizontal, terminals 16 and 18 are not shorted out, the light flasher, relay coil and buzzer are not energized.

If the driver dozes, his head will tend to tilt forwardly, causing the pool of mercury in switch 10 to move to the front of the switch housing, thereby causing terminals 16 and 18 to short out. When this occurs, the various circuits to the light flasher, relay coil and buzzer are closed, thereby energizing these elements. The light flasher causes the head and taillights to blink on and off to warn other motorists. If the buzzer does not alert the dozing driver to the impending danger, the fact that switch 54 is opened will minimize any such danger because such action will open the ignition circuit, thereby causing the engine to stop. Only by bringing the head up or in some other way opening the mercury switch can the motor be started again inasmuch as switch 54 controls the ignition circuit of the vehicle.

The present invention provides a simple means of utilizing a mercury switch responsive to the movements of the head and which can be easily and quickly coupled to various permanently mounted alarm devices through the use of the conventional cigarette lighter receptacle on the dashboard of a vehicle. This construction thereby simplifies the alarm system and allows it to be placed in operation quickly and easily, yet allows the vehicle to be operated normally if the alarm system is not to be used.

I claim:

1. An alarm system for a vehicle having a battery and a dashboard provided with a cigarette lighter receptacle, the combination with said battery and said receptacle of: a pair of eyeglasses having a temple; a switch having means for removably mounting the same on the temple and adapted to be actuated in response to a predetermined head movement when the eyeglasses are worn; cable means coupled to said switch and including a plug removably receivable in said receptacle for placing the switch in electrically coupled relationship to the receptacle, a number of alarm devices; and means connecting each alarm device in a respective electrical circuit with the receptacle and the battery common to each circuit, whereby actuation of each device will occur when the switch is actuated and when the plug is in the receptacle.

2. A system as set forth in claim 1, wherein said switch includes a mercury switch having a pair of spaced hooks for releasable attachment to said temple.

3. A system as set forth in claim 1, wherein said devices include a light flasher coupled to the head and taillights of the vehicle, a relay having a normally closed switch, and a buzzer mounted in the vehicle to warn an occupant of the vehicle, the switch of the relay adapted to be coupled to the ignition circuit of the vehicle.

* * * * *